United States Patent [19]

Stenneler

[11] Patent Number: 5,584,658
[45] Date of Patent: Dec. 17, 1996

[54] TURBOCOMPRESSOR DISK PROVIDED WITH AN ASYMMETRICAL CIRCULAR GROOVE

[75] Inventor: Jacques M. P. Stenneler, Le Chatelet En Brie, France

[73] Assignee: Societe Nationale d'Etude et de Construction de Moteurs d'Aviation "SNECMA", Paris, France

[21] Appl. No.: 505,386

[22] Filed: Jul. 21, 1995

[30] Foreign Application Priority Data

Aug. 3, 1994 [FR] France .................................. 94 09595

[51] Int. Cl.⁶ ........................................... F01D 5/30
[52] U.S. Cl. ........................ 416/215; 416/217; 416/218
[58] Field of Search .................................... 416/215, 216, 416/217, 218, 219

[56] References Cited

U.S. PATENT DOCUMENTS

| | | | |
|---|---|---|---|
| 2,255,486 | 9/1941 | Doran | 416/219 R |
| 2,295,012 | 9/1942 | Semar | 416/215 X |
| 4,451,203 | 5/1984 | Langley | 416/215 X |
| 4,460,315 | 7/1984 | Tseng et al. | 416/219 R X |
| 5,067,876 | 11/1991 | Moreman, III. | |
| 5,160,242 | 11/1992 | Brown | 416/219 R |
| 5,236,308 | 8/1993 | Czeratzki | 416/215 |
| 5,310,318 | 5/1994 | Lammas et al. | 416/219 R |
| 5,395,213 | 3/1995 | Stenneler. | |
| 5,474,421 | 12/1995 | Rossmann | 416/203 |

*Primary Examiner*—Edward K. Look
*Assistant Examiner*—Michael S. Lee
*Attorney, Agent, or Firm*—Oblon, Spivak, McClelland, Maier & Neustadt, P.C.

[57] ABSTRACT

A turbocompressor disk having on its periphery a circular groove able to receive blade roots having a substantially hammer shape, said circular groove comprising an upstream lip and a downstream lip against which bear the blade roots. The upstream lip has a curvature of gradient inclined by an angle $\alpha$ with respect to the plane perpendicular to the rotation axis and the downstream lip has a curvature of gradient inclined by an angle $\beta$ with respect to the plane perpendicular to the rotation axis, $\alpha$ being strictly different from $\beta$.

2 Claims, 4 Drawing Sheets

5,584,658

TURBOCOMPRESSOR DISK PROVIDED WITH AN ASYMMETRICAL CIRCULAR GROOVE

BACKGROUND OF THE INVENTION

1. Field of the Invention

The invention relates to a turbocompressor disk having an asymmetrical circular groove for receiving hammer attachment blades. It is used in the aeronautical field.

2. Description of the Background

In a turbine engine different types of connections between the blades and the disks are known. GENERAL ELECTRIC FR-A-2 660 361 (corresponding to U.S. Pat. No. 5,067,876) describes one of the blade/disk connections, according to which the blade roots are helical. In addition, the angles on each side of the blade root are constantly different compared with the surface of the disk and are only equal towards the center of the root. Such a blade/disk connection is generally used for pinned blades.

ROLLS ROYCE FR-A-2 504 975 describes a hammer root blade, whose fitting requires no access recess in the disk.

GENERAL ELECTRIC U.S. Pat. No. 4,460,315 describes a hammer attachment blade root installed on a conical sleeve with equal angles of the bearing faces β and β', but having opposite gradients and with contact surfaces which are mutually radially displaced.

FR-A-2 697 051 (corresponding to U.S. Pat. No. 5,395, 213) describes a compressor vane system with pinned cavities in which to a greater or lesser extent there is an increase in the material on the periphery of the disk in order to compensate the differences of the forces in the cavity.

Such a known blade/disk connection consists of axial attachments machined on the periphery of disk in order to permit the fitting of the blade roots.

Another conventional blade/disk connection design consists of a circular groove machined on the periphery of each disk. According to this design, the blades fitted in these grooves are of the "hammer attachment" type installed in the grooves Such a blade/disk connection design is illustrated in FIGS. 1A and 1B.

More specifically, FIG. 1A diagrammatically shows in a perspective view a disk according to the latter blade/disk connection design and having a symmetrical circular groove in which are inserted the hammer attachment blade roots. Thus, FIG. 1A shows the disk 1 with the circular groove 3, which has an upstream lip 5 and a downstream lip 7. Like all the blades mounted on the disk 1, the blade 2 has a blade root 4, whose shape is similar to a hammer, hence the term "hammer attachment blade".

FIG. 1B shows the same blade/disk connection as in FIG. 1A, but in a front view. It is possible to see in FIG. 1B the blade root 4 of the blade 2, the groove 3 of the disk 1, as well as the upstream lip 5 and downstream lip 7. FIG. 1B also shows that the blade root 4 has a shape which can be maintained in the groove 3, while being limited as regards movement by the lips 5 and 7 of the groove 3. These lips 5 and 7 have introduction slots 6 permitting the insertion of the blade roots in the groove 3. They also maintain the blade root 4 within the groove 3, no matter what the forces exerted on the blade 2.

FIG. 1B also shows that the groove 3 is symmetrical, lips 5 and 7 having curvatures, whose respective gradients P5 and P7 are inclined by the same angle δ with respect to a plane P perpendicular to the disk rotation axis. The rotation axis is not shown in FIG. 1B for simplification reasons. However, it is pointed out that it is substantially parallel to the base 2a of the blade 2.

The angles δ between the gradients P5 and P7 of the curvatures of the lips 5 and 7 and the plane P are equal, so that in this case the components R1 and R2 of the centrifugal force Fc induced by the blade 2 on the lips 5 and 7 of the groove 3 (which are also called contact forces on the lips 5 and 7) are equal and symmetrical with respect to the plane P. The resultant force R of these components R1 and R2 is consequently in the same sense and direction as the centrifugal force Fc and their points of origin are aligned on the radial axis of the disk.

Apart from the centrifugal force Fc, other forces stress the blade/disk connection and in particular stresses F1 and F2 transmitted by the sleeves 9 and 11, which interconnect the different compressor disks. These stresses F1 and F2 result from the aerodynamic axial forces induced by the blades and consequently differ between the individual blade stages.

Moreover, for design reasons, the upstream sleeves and downstream sleeves of the same disk generally have different geometries. Most frequently the upstream sleeve (sleeve 9 in FIG. 1B) is conical, whereas the downstream sleeve (sleeve 11 in FIG. 1B) is cylindrical. Therefore the upstream lip 5 and the downstream lip 7 of the circular groove 3 are not subject to the same stresses.

Moreover, with the compression ratio reached nowadays in turbine engines, very significant temperature differences are often encountered between the upstream and downstream sides of the compressor disks. Therefore very considerable differences in the service life periods of the upstream and downstream lips are very frequently encountered, which leads to supplementary maintenance costs.

It is finally obvious that the symmetry of the attachment introduces the risk of fitting the blade in the disk groove the wrong way round, i.e. placing the blade trailing edge in the upstream direction instead of the leading edge and vice versa.

FIGS. 2A and 2B show hammer attachment blades installed in the disk 1 of a conical stream, i.e. a stream inclined in the same way as would be encountered in a bypass turbofan engine with a very considerable bypass ratio. The conicity of the stream requires a significant clearance between the radial positions of the bearing faces of the lips 5 and 7, i.e. inner faces of the groove against which the blade root bears. This clearance influences the axial position of the resultant R of the components R1 and R2 of the centrifugal force on the lips 5 and 7. This resultant R is then misaligned with respect to the centrifugal force Fc, which means that the sense and direction of the faces R and Fc are identical, but their origins are not aligned on the radial axis of the disk.

Reference d in FIG. 2A represents the clearance between the resultant R and the centrifugal force Fc exerted in the center of gravity of the blade 2. Generally such a misalignment produces a parasitic torque on the blade 2.

FIG. 2A shows an example of a stream having a conicity such that the axis of the component R1 passes in the vicinity of the bearing face of the downstream lip 7.

Under axial stressing, the operational tolerances and the clearances between the blade root 4 and the groove 3 of the disk 1 enable the blade 2 to pivot about the center of rotation C located at the end of the downstream lip 7.

FIG. 2B shows the same blade/disk connection example as in FIG. 2A, but in the situation where the blade 2 is pivoting about the center of rotation C. FIG. 2B shows that the blade root 4 can escape from the disk groove 3.

SUMMARY OF THE INVENTION

The object of the present invention is to obviate the disadvantages referred to hereinbefore. It therefore proposes a compressor disk, whose circular groove has upstream and downstream lips which are asymmetrical to one another.

More specifically, the invention relates to a turbocompressor disk able to perform rotary movements about a rotation axis and having on its periphery a circular groove provided with an upstream lip and a downstream lip against which bear blade roots having a substantially hammer shape and which bear against said upstream and downstream lips. This disk is characterized in that the upstream lip and the downstream lip of the circular groove are asymmetrical relative to a plane perpendicular to the rotation axis, the upstream lip having a curvature with a gradient inclined by an angle $\alpha$ relative to the plane perpendicular to the rotation axis and the downstream lip has a curvature with a gradient inclined by an angle $\beta$ with respect to the plane perpendicular to the rotationa axis, with $\alpha$ strictly different from $\beta$.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENTS

Figure 1A:
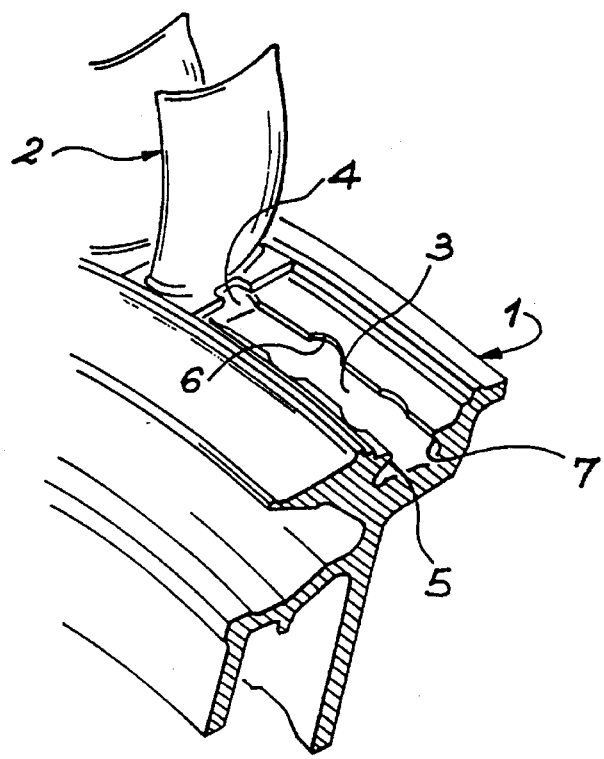
FIG. 1A, already described, shows a perspective view of blades fitted in the groove of a disk according to the prior art.
Figure 1B:
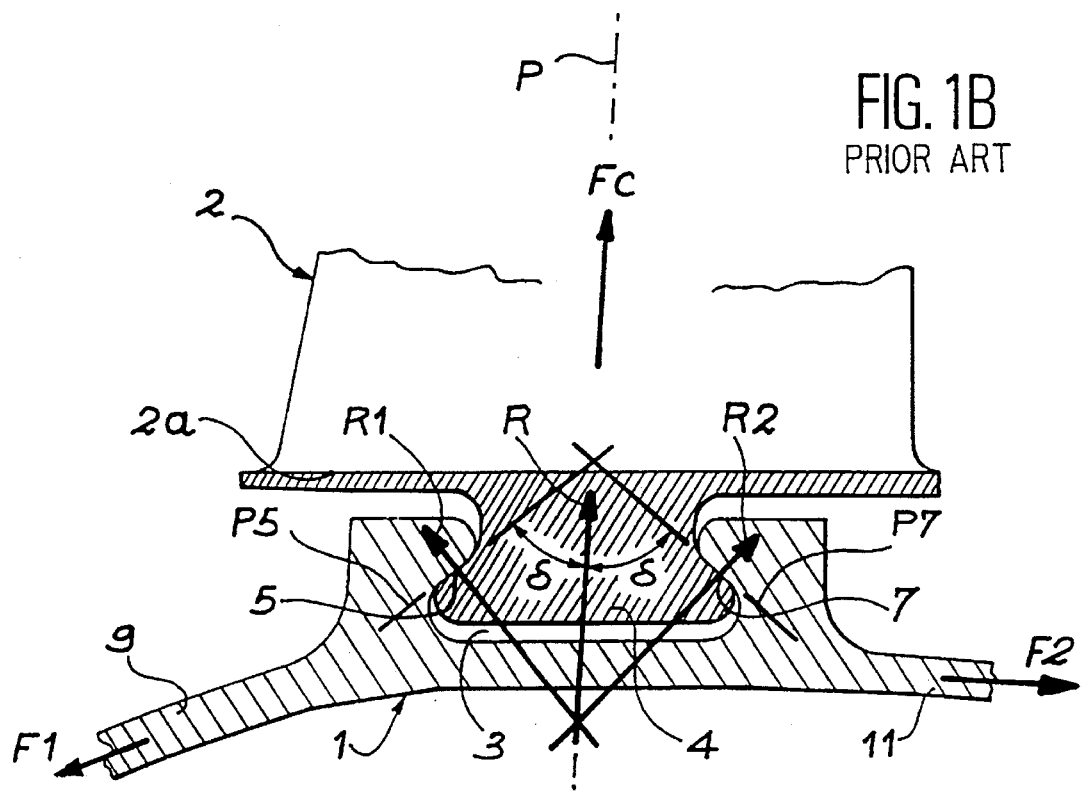
FIG. 1B, already described, shows a front view of the blade/disk connection of FIG. 1A.
Figure 3:
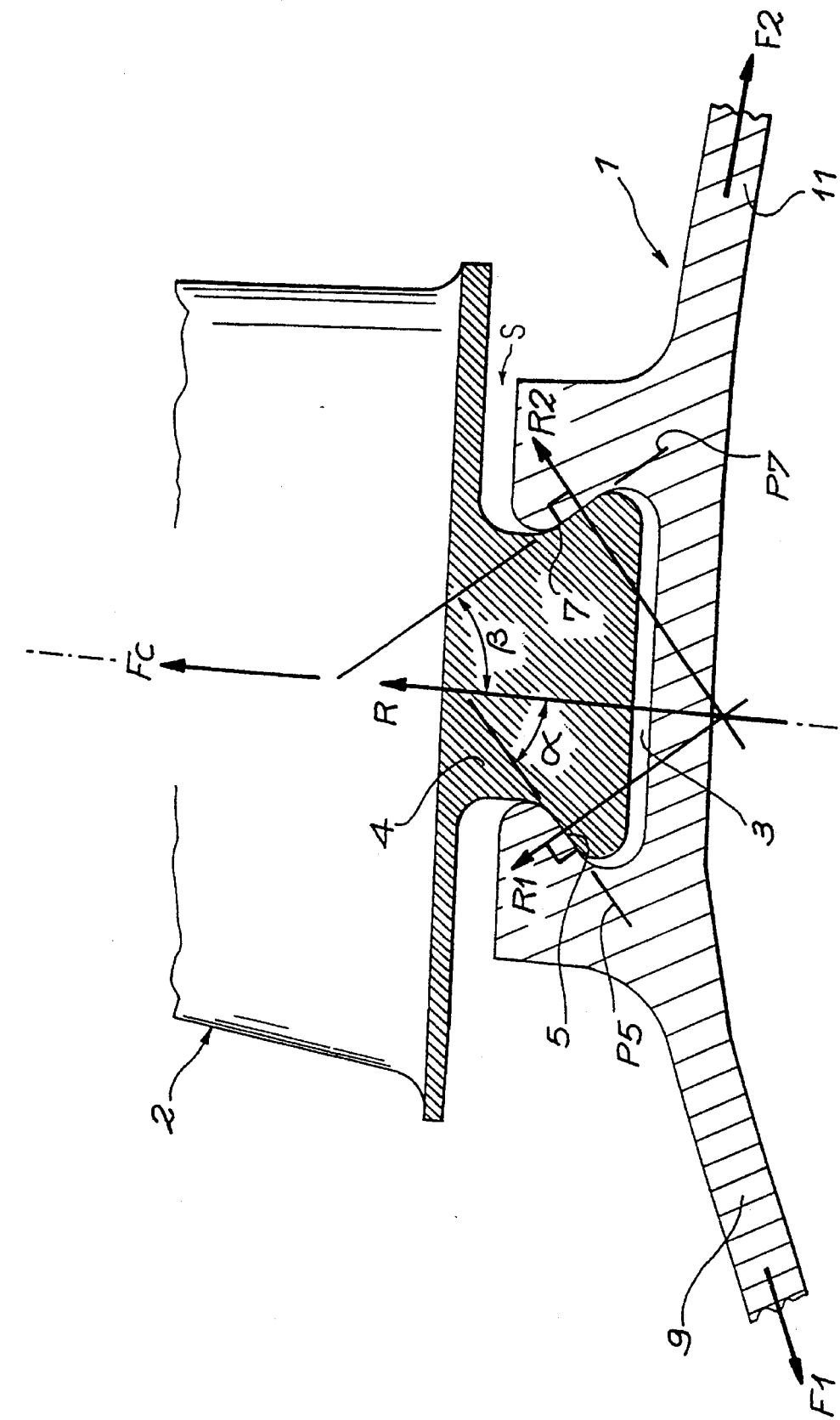
FIG. 3 shows a front view of a blade/disk connection according to the invention.

FIG. 3 shows a front view of the blade/disk connection according to the invention as in FIG. 1B relative to the prior art. FIG. 3 shows a blade 2, whose root 4 is introduced into the circular groove 3 of the disk 1. FIG. 3 also shows the upstream lip 5 and downstream lip 7 of the circular groove 3. It is also possible to see the gradient P7 of the curvature of the downstream lip 7. It is also possible to see the gradient P5 of the curvature of the upstream lip 5.

As can be gathered from FIG. 3, the gradient P7 of the curvature of the lip 7 forms an angle $\beta$ with the plane P perpendicular to the rotation axis of the disk, said rotation axis not being shown for reasons of simplification, as was stated in connection with the description of FIG. 1B. The straight line representing the gradient P5 of the curvature of the upstream lip 5 forms an angle $\alpha$ with the plane P.

According to the invention and as can be gathered from FIG. 3, the angle $\alpha$ strictly differs from the angle $\beta$ and said angles $\alpha$ and $\beta$ are not zero.

In the case of FIG. 3, the angle $\alpha$ is larger than the angle $\beta$. In other words, the angle $\beta$ between the plane P and the bearing face of the lip 7 is smaller than the angle $\alpha$ between the plane P and the bearing face of the upstream lip 5. This arrangement of the orientations of the gradients P5 and P7, due to the centrifugal force, leads to different contact forces R1 and R2. The contact force R2 due to the centrifugal force on the bearing face of the lip 7 is lower than the contact force R1 due to the centrifugal force on the bearing face of the lip 5. In addition, the resultant R of these contact forces R1 and R2 is displaced towards the downstream side of the disk. Therefore the axial blade/disk arrangement differs compared with that described in the prior art (FIG. 1B).

Consequently in order to obtain equivalent service life periods on each of the lips 5 and 7 of the circular groove 3, it is possible to optimize the dimensioning of the angles $\alpha$ and $\beta$, taking account of the combination of the contact forces (R1–R2) and the forces transmitted by the sleeves 9 and 11 (F1–F2), as well as the fatigue characteristics of the material from which the disk is made and which are dependent on the temperatures upstream and downstream of the disk.

It is also readily apparent that the fact of using blade/disk connections in which the disk groove 3 is asymmetrical makes it possible to facilitate the fitting of the blade in the disk by preventing the fitting of the blade the wrong way round, because one of the lips of the groove 3 has a greater curvature than the other.

Figure 2A:
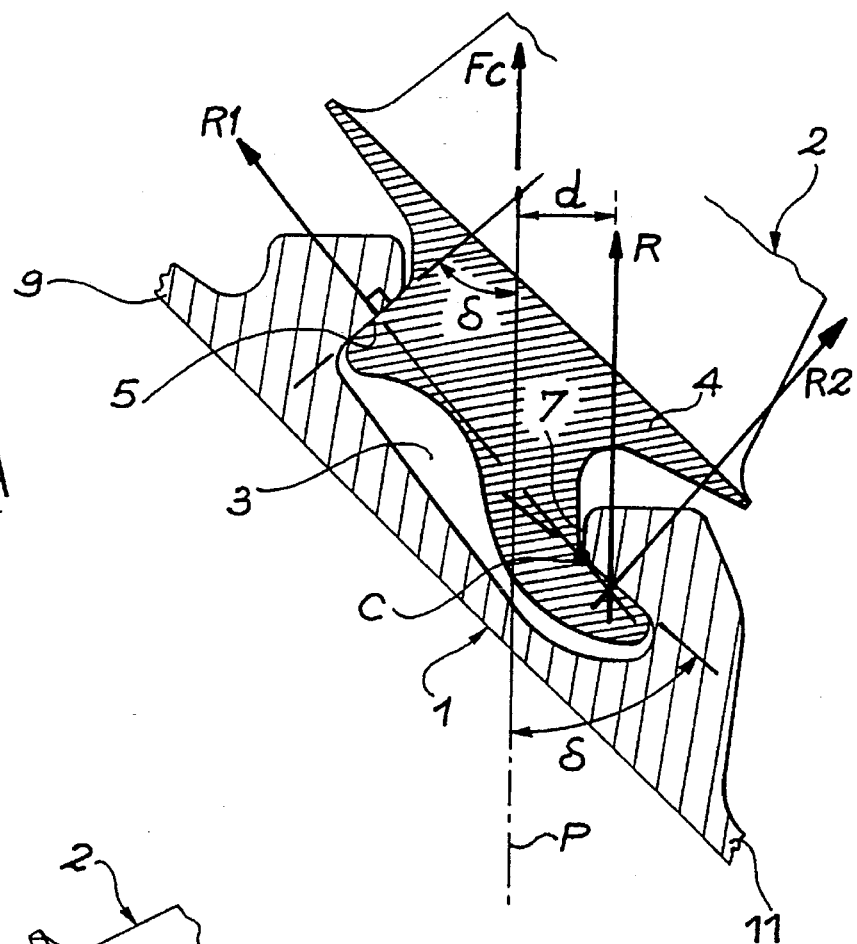
FIG. 2A, already described, shows a front view of a prior art blade/disk connection in a highly conical stream.
Figure 4A:
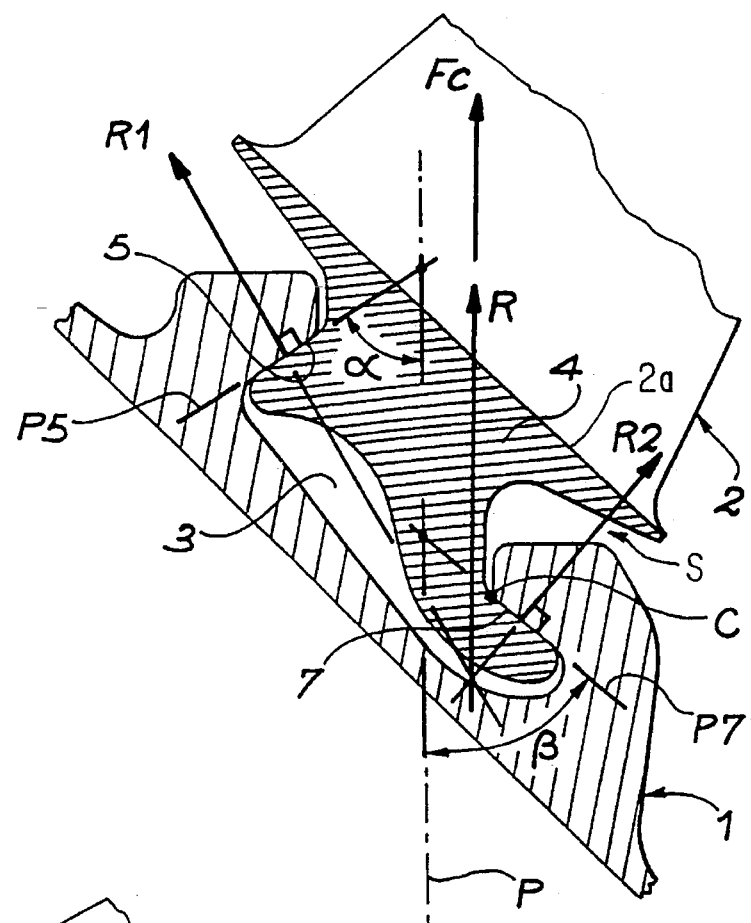
FIG. 4A shows a front view of a blade/disk connection according to the invention and such as is found in a highly conical stream.

FIG. 4A shows a blade/disk connection according to the invention applied to a highly inclined stream, which is similar to that shown in FIG. 2A showing a prior art blade/disk connection in a highly inclined stream.

In FIG. 4A, as in FIG. 2A, it is possible to see part of the disk 1 with its circular groove 3. As a result of the inclination of the stream, it can be seen that, as in FIG. 2A, the blade root 4 has a shape which is significantly different from the shape of the blade root 4 shown in FIG. 1B or FIG. 3. This is explained by the fact that the stream has a significant inclination. However, such blade roots 4 also form part of the hammer attachment blade type, because the shape of this blade root remains substantially the same as that of a hammer.

It is also possible to see in FIG. 4A that the blade root 4 bears on the one hand on the bearing face of the upstream lip 5 and on the other on the bearing face of the downstream lip 7. As in FIG. 3, P5 is the gradient of the curvature of the upstream lip 5 and P7 the gradient of the curvature of the downstream lip 7. The contact forces R1 and R2 are consequently perpendicular respectively to said gradients P5 and P7. The resultant of these contact forces R1 and R2 is designated R. The gradient P5 forms with the plane P perpendicular to the rotation axis of the disk 1 an angle $\alpha$. The gradient P7 of the downstream lip 7 forms with said same plane P an angle $\beta$. According to the invention, the angle $\alpha$ between the gradient P5 of the upstream lip 5 and the plane P strictly exceeds the angle $\beta$ between the gradient P7 of the downstream lip 7 and the plane P.

On comparing FIG. 4A with the prior art FIG. 2A, it is easily visible that by using such angles $\alpha$ and $\beta$ with $\alpha>\beta$, there is an alignment of the centrifugal force Fc of the blade with the resultant R of the contact forces R1 and R2 on the contact faces of the blade root 4 bearing on the upstream lip 5 and downstream lip 7. This alignment of the centrifugal force Fc with the resultant R of the contact force makes it possible to avoid the formation of a parasitic torque, as is the case in the prior art.

A difference in the value of the angles α and β makes it possible to obtain different mechanical stresses on either side of the groove 3, i.e. in the vicinity of the upstream lip 7 and the downstream lip 5. The choice of an angle α exceeding the angle δ of the prior art, which itself exceeds the angle β, by taking account of the contact forces R1 and R2 and the forces transmitted by the sleeves F1 and F2, makes it possible to obtain a substantially equivalent or equal service life for the upstream side and the downstream side of the circular groove 3.

Moreover, this differentiation of the angles α and β makes it possible to improve the behavior of the blade 2 with respect to tearing off, i.e. the tearing strength of the blade when the latter is exposed to high axial stresses, such as e.g. the sucking of birds into the compressor.

Figure 2B:
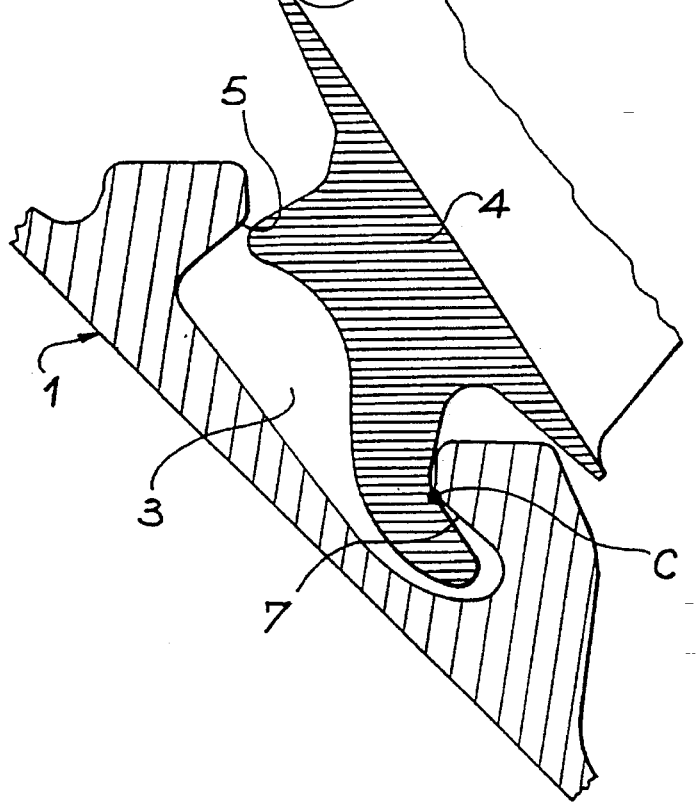
FIG. 2B, already described, shows a front view of the blade/disk connection of FIG. 2A, in the case where the blade pivots out of the disk groove.
Figure 4B:
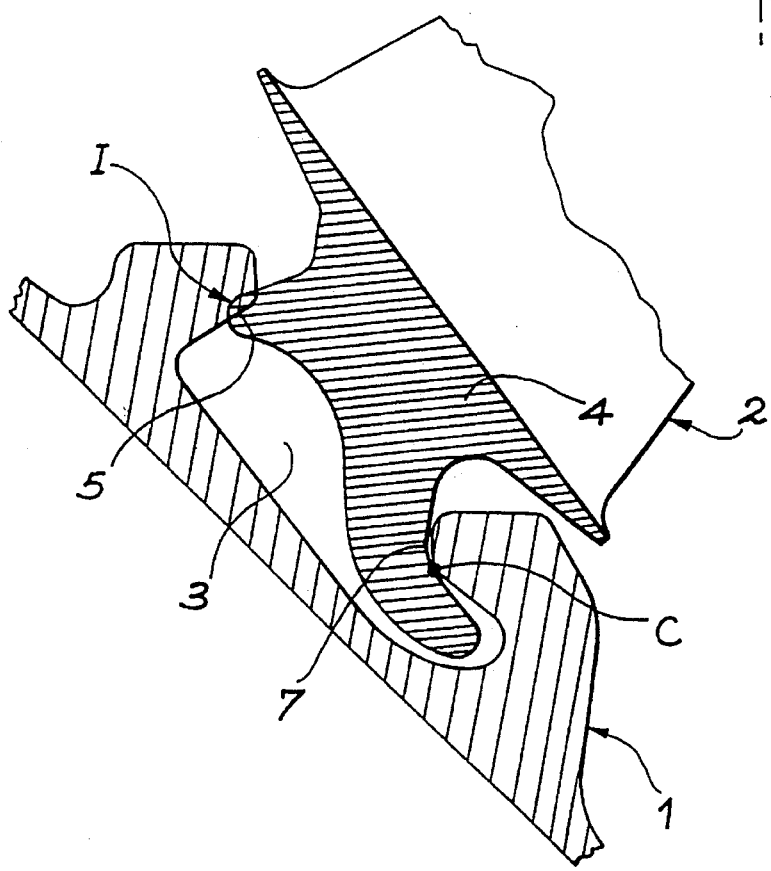
FIG. 4B shows a front view of the blade/disk connection of FIG. 4A in the case where the blade pivots about a centre of rotation.

FIG. 4B shows the same blade/disk connection as in FIG. 4A, but in the case where the blade 2, exposed to high axial stresses, pivots about the center of rotation C, constituted by the end of the downstream lip 7. If FIG. 4B is compared with the prior art FIG. 2B, the advantage of choosing an angle α exceeding the angle δ of the prior art is immediately apparent, which corresponds to choosing an upstream lip 5 of higher curvature than that of the prior art. In parallel, the choice of an angle β below the angle δ of FIG. 2B amounts to choosing a downstream lip 7 having a curvature with a smaller gradient than that of the prior art. These differences as compared with the prior art explain why, under axial stressing, the blade 2 which pivots about the center of rotation C cannot escape from the circular groove 3, because its blade root 4 is held by the upstream lip 5. In FIG. 4B the reference I designates the impact point between the blade root 4 and the lip 5 of the circular groove 3 in the case where the blade 2 pivots about the center of rotation C.

Thus, such a blade/disk connection provided with an asymmetrical circular groove 3 between the upstream side and downstream side of the disk 1 has the advantage of permitting a substantially equivalent or equal service life of the downstream and upstream parts of the disk and also leads to an alignment of the centrifugal force Fc of the blade with the resultant R of the contact forces of the blades in the disk groove, which avoids the formation of parasitic torques. As shown in the figures, an open space S is formed between a downstream portion of the disk 1 holding the blade root 4 and a base portion 2a of the blade 4.

In addition, the blade/disk connection according to the invention leads to an improvement for compressors having a highly inclined stream of the tearing strength of blades subject to high axial stresses.

Obviously, numerous modifications and variations of the present invention are possible in light of the above teachings. It is therefore to be understood that, within the scope of the appended claims, the invention may be practiced otherwise than as specifically described herein.

I claim:

1. A turbocompressor disk performing rotary movement about a rotational axis, which comprises:

a circular groove formed in the periphery of the disk and receiving a blade root, said circular groove including an upstream lip and a downstream lip against which the blade root bears, wherein the upstream lip and the downstream lip of the circular groove are asymmetrical with respect to a plane perpendicular to the rotational axis, the upstream lip having a curvature of gradient inclined by an angle α with respect to a plane perpendicular to the rotational axis of the disk and the downstream lip having a curvature of gradient inclined by an angle β relative to the plane perpendicular to the rotational axis the angle α is greater than the angle β and wherein an open space is formed between a downstream portion of the disk holding the blade root and a base portion of the blade.

2. A turbocompressor disk as claimed in claim 1, wherein contact forces R1 and R2 due to centrifugal forces of the blade on the upstream lip and downstream lip, respectively, are such that R1>R2 and a resultant force R of forces R1 and R2 is such that said resultant force is displaced toward a downstream side of the disk.

* * * * *